(12) United States Patent
Baszucki

(10) Patent No.: US 8,832,568 B2
(45) Date of Patent: Sep. 9, 2014

(54) SYSTEM AND METHODS FOR MANAGING DISTRIBUTED PHYSICS SIMULATION OF OBJECTS IN A VIRTUAL ENVIRONMENT

(75) Inventor: David Baszucki, Portola Valley, CA (US)

(73) Assignee: Roblox Corporation, San Mateo, CA (US)

( * ) Notice: Subject to any disclaimer, the term of this patent is extended or adjusted under 35 U.S.C. 154(b) by 347 days.

(21) Appl. No.: 12/623,292

(22) Filed: Nov. 20, 2009

(65) Prior Publication Data

US 2011/0126131 A1    May 26, 2011

(51) Int. Cl.
*G06F 3/048* (2013.01)
*G06F 15/173* (2006.01)
*G06F 3/01* (2006.01)

(52) U.S. Cl.
CPC ............... *G06F 3/011* (2013.01); *G06F 3/048* (2013.01); *G06F 15/173* (2013.01)
USPC ............................................ 715/757; 463/42

(58) Field of Classification Search
USPC ............................................ 463/42; 345/473
See application file for complete search history.

(56) References Cited

U.S. PATENT DOCUMENTS

| | | | |
|---|---|---|---|
| 2007/0066400 A1* | 3/2007 | Kogo | 463/42 |
| 2007/0129148 A1* | 6/2007 | Van Luchene | 463/42 |
| 2008/0043026 A1* | 2/2008 | Bordes | 345/473 |
| 2008/0133652 A1* | 6/2008 | Richards | 709/203 |
| 2009/0181777 A1* | 7/2009 | Christiani et al. | 463/42 |
| 2009/0275414 A1* | 11/2009 | Lee et al. | 463/42 |
| 2009/0325712 A1* | 12/2009 | Rance | 463/42 |

* cited by examiner

*Primary Examiner* — Matt Kim
*Assistant Examiner* — Tuan S Nguyen
(74) *Attorney, Agent, or Firm* — Donald R. Boys; Central Coast Patent Agency, Inc.

(57) ABSTRACT

A computerized server managing a Virtual Environment (VE) has a network port for communicating with remote computerized appliances, a plurality of virtually-defined rigid objects in the VE, including one or more avatars representing persons in the VE, a physics simulation engine executing from a machine-readable medium, for calculating object states and properties, including motion of virtually-defined rigid objects, and a mechanism for assigning and tracking identification of remote computerized appliances connected via the network port, each remote appliance capable of physics simulation. The server responds to signals from the remote computerized appliances to assign individual ones of the virtually-defined rigid objects to individual ones of the remote computerized appliances for physics simulation, and the server simulates all virtually-defined objects in the VE that are not assigned to at least one of the remote computerized appliances.

8 Claims, 7 Drawing Sheets

SYSTEM AND METHODS FOR MANAGING DISTRIBUTED PHYSICS SIMULATION OF OBJECTS IN A VIRTUAL ENVIRONMENT

BACKGROUND OF THE INVENTION

1. Field of the Invention

The present invention is in the field of computer-aided modeling and pertains particularly to methods and apparatus for managing physics simulation of three dimensional objects over multiple client computing appliances.

2. Discussion of the State of the Art

In the art of computer-aided modeling, virtual environments (VEs) are created and exist for such as educational and entertainment purposes. Virtual reality games, three dimensional toys, and other types of virtual environments exist where clients subscribe to a gaming site or virtual-world site and engage in interaction with the virtual presentations. Virtual environments comprise objects with attributes and properties. Many of these objects require physics simulation of the objects to emulate the results of object interaction during runtime of the VE. A rigid-body-dynamics simulation engine is an example of one processing engine adapted to simulate motion and dynamics of a three dimensional object in a virtual environment.

As users demand larger and more complex VEs, physics simulation of rigid body dynamics of a very large virtual world may become a challenge to accomplish on a single computer. Simulating a large virtual world is computationally expensive and requires robust server resources.

Therefore, what is clearly needed is a system and methods for managing physics simulation of objects in a virtual environment distributed over multiple client computing devices of clients engaged in interacting with the virtual environment. A system such as this would decrease load on a core server machines, reduce perceived lag time between interaction and simulation results and would result in a capability of offering larger and more complex virtual environments with less expense relative to computer processing resources required to simulate the physics of the environment.

SUMMARY OF THE INVENTION

The inventor has recognized a need for reducing the computation load of servers providing Dynamic Virtual Environments which may be visited and interacted with by persons using computerized appliances connected to the server through network paths. Accordingly, in an embodiment of the invention a computerized server managing a Virtual Environment (VE) is provided, comprising a network port for communicating with remote computerized appliances, a plurality of virtually-defined rigid objects in the VE, including one or more avatars representing persons in the VE, a physics simulation engine executing from a machine-readable medium, for calculating object states and properties, including motion of virtually-defined rigid objects, and a mechanism for assigning and tracking identification of remote computerized appliances connected via the network port, each remote appliance capable of physics simulation. The server responds to signals from the remote computerized appliances to assign individual ones of the virtually-defined rigid objects to individual ones of the remote computerized appliances for physics simulation, and the server simulates all virtually-defined objects in the VE that are not assigned to at least one of the remote computerized appliances.

Also in an embodiment of the invention the network is the Internet network, and the remote computerized appliances are internet-connected appliances used by persons to interact with the VE managed by the server. Further in an embodiment of the invention the server periodically receives simulation data from individual ones of the remote computerized appliances, according to virtually-defined rigid objects assigned for simulation to those appliances, updates the VE accordingly, and transmits updated state of the VE periodically to individual ones of the remote computerized appliances.

In one embodiment the assignment of virtual objects for simulation to remote appliances is dynamic, and reassignment is made periodically according to data received from the remote computerized appliances. Further in this embodiment, individual ones of the remote computerized appliances comprise a mechanism for tracking local computer resources available for physics simulation of virtually defined objects, and individual ones of the appliances expand or contract requests for local simulation depending on computer resources available.

In another aspect of the invention a method for managing a Virtual Environment (VE) by a network-connected server is provided, comprising the steps of (a) defining a plurality of virtual rigid objects in the VE, including one or more avatars representing persons in the VE; (b) establishing communication with one or more remote computerized appliances via a network port; (c) assigning identification to connected remote computerized appliances; (d) assigning individual ones of the virtual rigid objects in the VE to individual ones of the remote computerized appliances for physics simulation according to requests from the remote computerized appliances in communication with the network-connected server; and (e) simulating state and properties of all virtually-defined objects in the VE that are not assigned to at least one of the remote computerized appliances, by a simulation engine coupled to the network-connected server.

In one embodiment the network is the Internet network, and the remote computerized appliances are internet-connected appliances used by persons to interact with the VE managed by the server. Also in an embodiment the server periodically receives simulation data from individual ones of the remote computerized appliances, according to virtually-defined rigid objects assigned for simulation to those appliances, updates the VE accordingly, and transmits updated state of the VE periodically to individual ones of the remote computerized appliances.

Further in an embodiment the assignment of virtual objects for simulation to remote appliances is dynamic, and reassignment is made periodically according to data received from the remote computerized appliances. And still further, individual ones of the remote computerized appliances comprise a mechanism for tracking local computer resources available for physics simulation of virtually defined objects, and individual ones of the appliances expand or contract requests for local simulation depending on computer resources available.

BRIEF DESCRIPTION OF THE DRAWING FIGURES

DETAILED DESCRIPTION

In embodiments of the present invention, the inventors provide a system and methods for managing distributed physics simulation loads relative to virtual objects on multiple clients in a server/client-based virtual environment hosted on a digital network. The present invention is described in enabling detail using the following illustrated examples, which may include more than one embodiment of the present invention.

Figure 1:
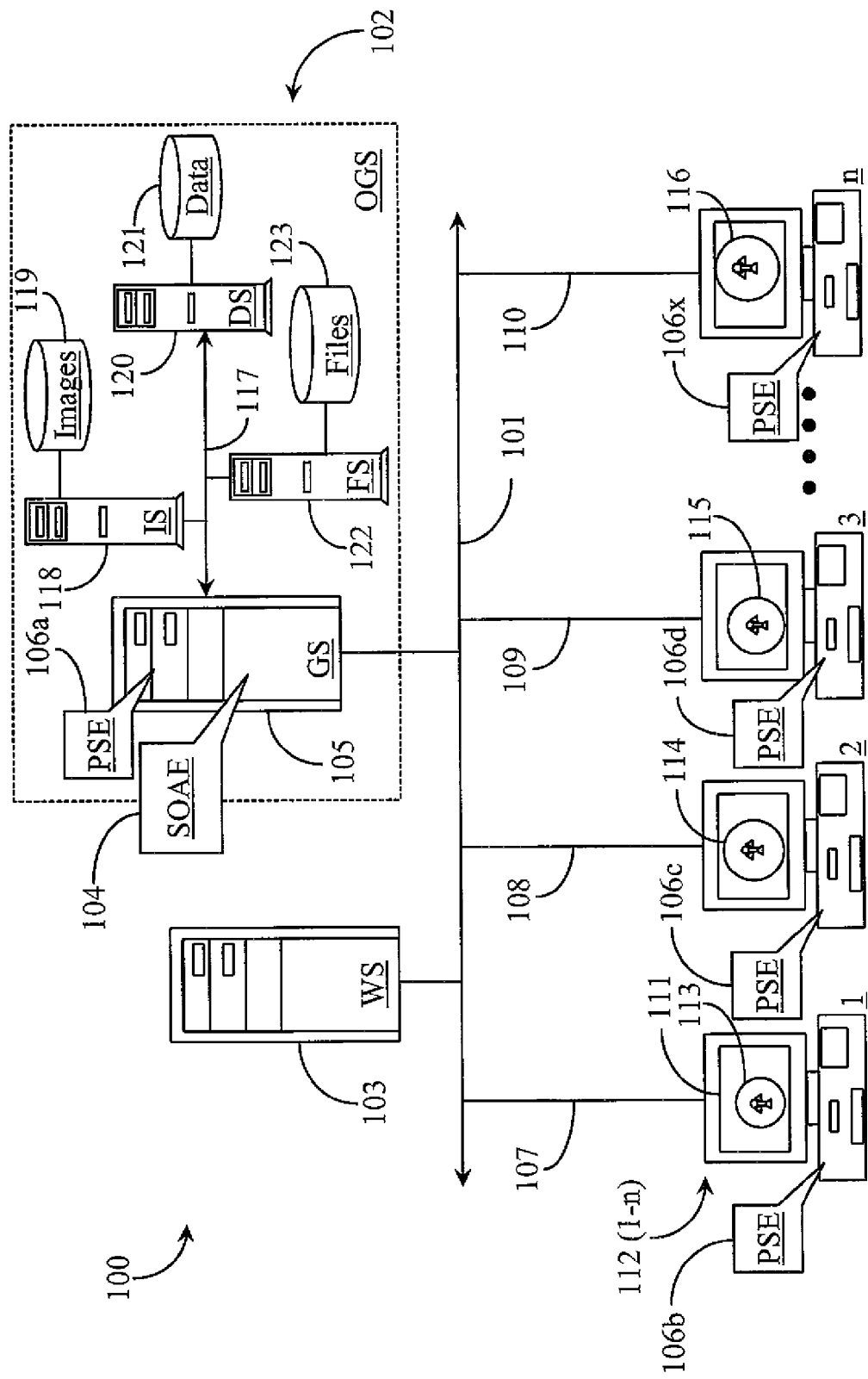
FIG. 1 is an architectural overview of a communications network that supports distributed physics simulation and management thereof according to an embodiment of the present invention.

FIG. 1 is an architectural overview of a communications network 100 that supports distributed physics simulation and management thereof according to an embodiment of the present invention. Communications network 100 represents a digital wide-area-network (WAN) such as an Internet network. A network backbone 101 is illustrated in this example and represents all of the lines, equipment, and access points that make up the Internet network as a whole. Therefore, there are no geographic limitations to the practice of the present invention. Network 100 may include the Internet network and any connected sub-networks including telephone carriers that may provide access to network 100 physically represented herein by backbone 101.

In this example, network backbone 101 serves as a carrier network for communications between an online gaming service (OGS) 102 and multiple clients 112 (1-n) of OGS 102. OGS 102 represents any business adapted to provide an online virtual environment (VE), including virtual worlds and other online games. Such virtual worlds and online games may be accessed by subscribing clients operating client computing devices 112 (1-n). OGS 102 may lease or may host and maintain a Web server (WS) 103 including a Web site (not illustrated) that serves as service access point (SAP) for clients operating client computing devices 112 (1-n). WS 103 has connection to network backbone 101 for communication and access purposes.

WS 103 includes a digital medium (not illustrated) coupled thereto which is adapted to store all of the software and data required to enable server function as a Web server capable of serving electronic information pages to clients of OGS 102, and of registering clients for access to virtual environments and or online gaming available through OGS 102. In one embodiment WS 103 may be located within the physical domain of OGS 102 without departing from the spirit and scope of the present invention.

Client computing devices 112 (1-n) are desktop personal computers (PCs) in this example. In other embodiments other types of personal computing devices might be used to access WS 103 and to engage services offered by OGS 102. Other type of device that might be used to connect to WS 103 for the purpose of accessing OGS services include but are not limited to a laptop computer, a cellular (smart) telephone, a personal digital assistant (PDA), a specialized gaming box, or a Web-TV. In this example, client computing devices 112 (1-n) are connected to network backbone 101 via logical access line connections 107, 108, 109, and 110. It is noted herein that client computing devices 112 (1-n) may connect to network backbone 101 through an Internet Service Provider (ISP) using a high-speed Internet access protocol like digital services line (DSL), broadband, T1-X, wireless (WiFi), cable/modem, and in other ways as well.

Each client device 112 (1-n) includes at least one central processing unit (CPU) coupled thereto and adapted to execute all of the software and data required to enable multi-task or dedicated computing function. Each client device 112 (1-n) includes a browser application 111 (one per device), used to connect to and to navigate to Web-based services including Web Pages and gaming services though re-direction of clients from WS 103 to an online gaming server (GS) 105 illustrated within the physical domain of OGS 102. GS 105 has connection to network backbone 101 and includes at least one digital medium (not illustrated) coupled thereto and adapted to store all of the software and data required to enable server function as an online game server. OGS 105 includes, among other game server components, a physics simulation engine (PSE) 106a. PSE 106a provides real-time physics simulation of 3D objects of a VE. In one embodiment PSE 106a is a rigid-body-dynamics simulation engine although other types and combinations thereof might be used in practice of the present invention.

In this example client computing devices 112 (1-n) are all connected online over network backbone 101 with GS 105 and are actively engaged in a VE offered through the server, such as a virtual world or other online game comprising one or more virtual three dimensional (3D) objects that require physics simulation of motion during game play or engagement with the virtual world. Each client computing device has an executable application resident thereon that includes at least a subset or a version of PSE (106a) provided on GS 105. Those illustrated versions of PSE are a PSE 106b running on client computing device 112 (1), a PSE 106c running on client computing device 112 (2), a PSE 106d running on client computing device 112 (3), and a PSE 106x running on client computing device 112 (n).

In this regard, each display of client computing devices 112 (1-n) exhibits an avatar and a local client simulation region (CSR). Machine readable code including at least a CPU monitor and a PSE is available to client computing devices through a downloaded application or plug-in from WS 103 or GS 105. The respective versions of PSE enable each client computing device 112 (1-n) to physically simulate motion of such virtual objects that may reside within each CSR. Each CSR represents a portion of space of the total available virtual space of a virtual world or other VE containing objects for physics simulation. Each avatar, for example, represents a 3D object owned by the client engaged in a 3D VE offered by OGS 102.

A 3D object in a VE includes but is not limited to properties and attributes such as a Guid (unique identifier), a position property including a position rotation property, a velocity property including a rotational velocity property, and geometry. A 3D object in a VE may also contain but is not limited to containing the following physical properties: object mass, moment of inertia for the object, object density, and friction. The appearance attributes of an object include the geometry and texture of the object. In most virtual environments the avatar represents the client engaged in the environment. Multiple avatars indicate multiple clients engaged in the virtual world or environment. In this example, client computing device 112 (1) exhibits a CSR 113 on the display of the device. Similarly, computing clients 112 (2-n) exhibit CSRs 114, 115, and 116 on the associated display devices respectively.

For purpose of this specification a CSR is a client physics simulation region defining an area of virtual space of a VE within which a client may physically simulate objects. A CSR is enabled by a CPU monitoring application (not illustrated) residing on the computing client. Such an application is part of the same machine-readable application code including the PSE version residing on the client computing device. A CSR has an evolving shape and/or volume/size that is dictated by available CPU capacity monitored in real time during client engagement with a VE offered through OGS 102.

The shape of a CSR may vary or may be relatively consistent. A CSR may be spherical, rectangular, polygonal, trapezoidal, cylindrical, triangular, elliptical, or some other geometry without departing from the spirit and scope of the present invention. Each CSR may be geometrically aligned in a true position relative to the center of mass of the avatar with which it is associated. For example, if the CSR is a sphere, the center of mass of the avatar may mark the center of the sphere. A client operating in a VE at the position of it's avatar in total virtual space attempts to physically simulate those 3D objects residing closest to it. Therefore, within a CSR of an avatar there would presumably be one or more 3D objects other than the avatar to be physically simulated by that client computing device (CPU) using the resident PSE version on that device. More about distributed physics simulation of 3D objects in a VE is described later in this specification.

GS 105 has a separate digital network connection 117 to various support servers and data repositories adapted to facilitate game service delivery. An image server (IS) 118 is provided within OGS 102 and is connected to GS 105 over network 117. IS 118 has a digital medium coupled thereto adapted to store all of the software and data required to enable function as an image server. IS 118 is adapted primarily to serve VE images to GS 105 from an image repository 119. Repository 119 may be a mechanical disk drive, a magnetic disk or an optical disk, or other known data repository without departing from the spirit and scope of the present invention.

A file server (FS) 122 is provided within OGS 102 and is connected to GS 105 over network 117. FS 122 has a digital medium coupled thereto and adapted to store all of the software and data required to enable function as a file server. FS 122 is adapted to serve files representing online VEs including virtual worlds, virtual games, etc. to GS 105 for rendering. FS 122 manages game or VE files on a file repository 123, which may be a mechanical, magnetic or an optical storage medium.

A data server (DS) 120 is provided within OGS 102 and is connected to GS 105 via network 117. DS 120 has a digital medium coupled thereto which is adapted to store all of the software and data required to enable server function as a data server. DS 120 is adapted to serve run-time data relative to any VEs being rendered by GS 105. Data may include any technical data and information required to successfully render a VE in real time.

GS 105 has a dynamic simulation owner assignment engine (SOAE) 104 provided thereto as an executable parent application resident on the digital medium of the server. SOAE 104 is adapted to assign ownership of physics simulation of one or more 3D objects of a VE to one or more computing clients 112 (1-n). The invention is practiced using an automated server/client connection between each client and GS 105.

In practice of the invention, assume computing clients 112 (1-n) are all connected to GS 105 and are all participating in interaction with a VE running on the server. PSEs 106b through 106x facilitate local physics simulation of 3D objects on the client computing devices. CSRs 113 through 116 represent the physics simulation regions containing objects that the clients are allowed (and enabled) to simulate locally. PSE 106a running on GS 105 simulates (server-side) all of the 3D objects of the VE that are not simulated locally (client-side). SOAE 104 listens for information updates from client computing devices and assigns simulation ownership to those objects which fall within a CSR to the client ID associated with that CSR for all of the client CSRs. Objects that do not fall within a CSR are simulated by the server engine (PSE 106a). It is noted herein that assignments made by SOAE 104 are temporary and dynamic, such that an object may change simulation owners many times during run time.

The volume of a CSR changes depending on the current processing capacity of the local CPU supplying the processing resource for the local PSE used to simulate motion, collision, contact, and other attributes of an object. A local PSE contains all of the logic, instructions, and rules to enable complete physics simulation of an object on the local computing device. A small monitoring application keeps track of the simulation process and calculates a total volume of a local CSR based on the time that it takes for the CPU to process simulation of one or multiple objects within the CSR. As a result, the current volume of a local CSR is expanded and decreased on a continual basis throughout runtime of the VE.

One or more threshold values relative to objects simulated over time may be established, in one embodiment with weighting associated with CPU type and available RAM. In one embodiment available bandwidth can also be a weighting factor in determining size of a physics simulation region for a client. There may be minimum system requirements for local physics simulation of VE objects. As a local CSR, such as CSR 113 on client computing device 112 (1) expands, it may encompass additional 3D objects that may then, by reassignment, be simulated by that client. Similarly, the available volume of a local CSR may contract thus freeing up some 3D objects for reassignment to another physics simulation owner (PSO) such as another client or the server. All of the current CSRs of a VE are mapped according to avatar position in a preferred embodiment to a data structure held and maintained by data server 120 or by GS 105. This data structure (not illustrated here) is termed a "client ownership map" which is continually updated with new information during runtime. The primary intelligence of the mapping is which client is currently in charge of simulating which objects in the VE, and which objects in the VE have the server (PSE 106a) as the simulation owner.

The amount of physics simulation of objects performed by clients or players is determined locally on the computing device of each client/player. Any objects not simulated by a client are simulated by the server. SOAE 104 updates the client ownership mapping as a result of continuous client updates relative to the current volume of the CSR. Those objects that become included in a CSR may be reassigned to the client of that CSR for simulation and those objects that become freed from a CSR due to decreasing volume of the CSR are reassigned to another client (if "positionally" within another CSR or to the server if they are not found within a boundary of a CSR). A continual process of object lookup, object simulation owner reassignment, and mapping update takes place at the server based on continuous or periodic client updates.

Updating is frequent, on the order of 30 cycles per second more or less. GS 105 also propagates all of the updates in object position and properties to all other clients engaged in game play. It is noted in this example that communication between GS 105 and client computing devices 112 (1-*n*) occurs in unidirectional transmissions similar to a walkie-talkie transmission. When a client has some information to update to the server it pushes the information to the server transparent of the client. When GS 105 has information to send to clients, it pushes the information to each client transparent of the client. In this way updates are faster and more efficient. More detail about managing dynamic assignment of simulation ownership is provided later in this specification.

Figure 2:
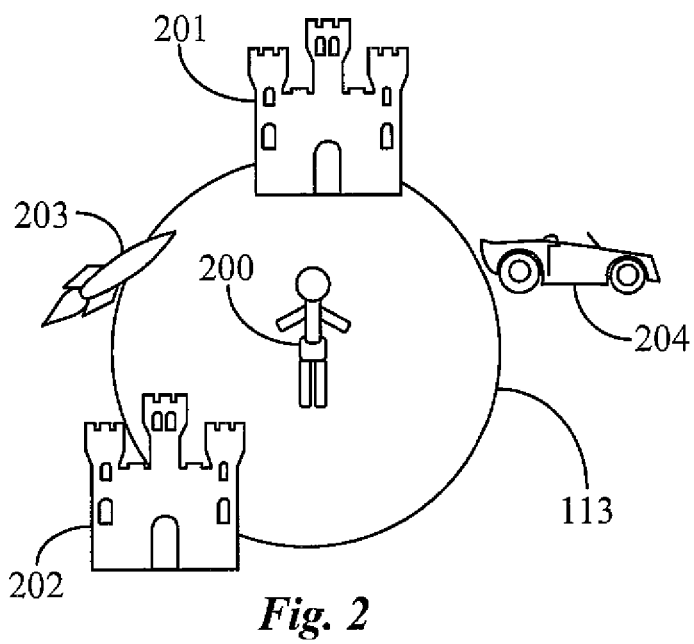
FIG. 2 is a block diagram of a client physics-simulation region established geometrically about a client avatar according to an embodiment of the present invention.

FIG. 2 is a block diagram illustrating a client physics-simulation region (CSR) 113 established geometrically about a client avatar 200 according to an embodiment of the present invention. Simulation region 113 may be a three dimensional sphere or cylinder or any other volumetric geometry. Region 113 is established locally based on what objects a client attempts to physically simulate locally using the primary CPU of the client's computing device with the aid of the local PSE. Simulation region 113 is not visible to the client and all physics simulation whether performed at the server by the client or by other clients is transparent to the client as far as simulation owner is concerned. However, in one embodiment a small interface may be made available to clients where simulation activity performed on the client and the drain on processing resources of such physics simulation may be reported statistically for informational purposes. Such an interface may be integrated into the OS CPU performance interface that reports threads, networking status, and other CPU performance data.

Avatar 200 represents the client and is given a unique identifier or client identification (CL-ID). The center of mass of avatar 200 may be the center of simulation region 113. Objects that the client could simulate relative to physics include avatar 200, castle 201, rocket 203, and sports car 204. In this case region 113 does not encompass any of the objects with the exception of avatar 200, which the client simulates the entire runtime of the VE. Based on CPU processing capacity, region 113 will expand and contract to include or exclude virtual objects that require physics simulation. In this example the client is in charge of physics simulation of his or her own avatar 200.

As more processing power is available, region 113 will expand as the client attempts to simulate some of the nearby objects being simulated by the server or another client. Each virtual object that is rigid has a rigid center of mass. This center of mass may be a variable in simulation ownership assignment. For example, in this case the center of mass for objects 201, 202, 203, and 204 lie outside the boundary of sphere 113, thus they are being simulated by other clients or the server. However, client (avatar) 200 will attempt to simulate these objects based on available processing capacity and region 113 will then expand to encompass the center of mass of one or more of these objects. When this occurs, the client reports these objects to the server as objects that the client can simulate or objects that the client is currently simulating. The server may lookup these objects and may reassign these objects to the client (200) for physics simulation. The server then updates the simulation ownership map and propagates the change to all other clients. In another embodiment, other types of tests to determine if an object might be within a simulation region, rather than reliance on the center of mass point for an object. For example, an alternate test might be if any part of a 3D object was in the simulation region, rather than the center of mass.

Figure 3:
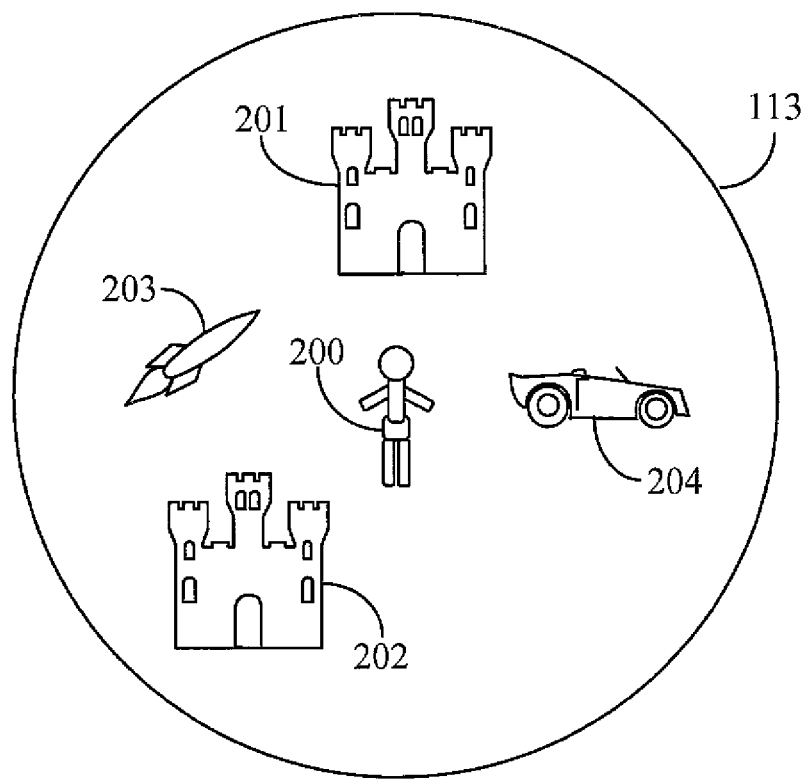
FIG. 3 is a block diagram of the client physics-simulation region of FIG. 2 expanded to include one or more virtual objects for physics simulation according to an embodiment of the present invention.

FIG. 3 is a block diagram illustrating client physics-simulation region 113 of FIG. 2 expanded to include all of the virtual objects shown in FIG. 2 for physics simulation according to an embodiment of the present invention. Simulation region 113 is expanded in this case based on monitored CPU capacity, to encompass objects 201, 202, 203, and 204. In one embodiment all of these objects must be simulated relative to physics by client 200 because they lie within the boundary of simulation region 113. As described above, it may be sufficient that the center of mass of an object lie within the region in order to qualify for simulation ownership. This means that part of the object may lie outside the region of simulation of the client.

It is possible that two or more client simulation regions might overlap one another such that the center of mass of a virtual object lies within the boundaries of two or more client simulation regions (CSRs). In such a case, the server may partition the overlapped portions of the regions such that they no longer overlap. The region that is currently the largest region trying to simulate an object may "win" assignment of a contested object. That is to say that the region having the most capacity may get the decision in a case where an object equally shares two or more simulation regions. In another embodiment it may be required that an object lies fully within the bounds of a region before it may be simulated locally by the client of that region.

In one embodiment there is no CSR established until a client attempts to physically simulate one or more objects other than the client avatar. In this case the client requests physics simulation of an object during interaction with the object and a CSR is first established about the avatar and the initial object, which is assigned automatically to the client attempting to simulate it. As the client attempts to simulate more objects close to it, the assignments of new objects will be made as long as sufficient processing capacity exists on that client such that the CSR encompasses those objects. Processing capacity might be measured as a function of processing drain over time when physically simulating objects. Some clients will have more processing capacity than others for physics simulation of objects.

As long as processing capacity remains stable for a client physically simulating objects, then the size of the CSR region and the number of objects being simulated by the client may remain relatively constant. However, if processing capacity destabilizes with respect to the processing load on the CPU while simulating objects, the size of region 113 may decrease to the point that one or more objects being simulated by the client now lie outside the boundary of the CSR and are thus reassigned to another client or the server for physics simulation. Any virtual objects that cannot be simulated by a client because they lie outside any CSR boundary may be simulated by the server.

It is important to note herein that some virtual objects will require more processing power to simulate the physics thereof than other objects. This may also be true relative to the intensity of simulation of an object having multiple properties that may be simulated. In one embodiment a priority might be established for high-profile game objects in any VE where a hierarchy is represented for the objects such that those with lower processing requirements are physically simulated by clients while those requiring higher levels of processing are retained by the server for simulation. Other priority schemes may be ordered without departing from the spirit and scope of the present invention. One effect of local simulation is that there is a reduction in perceived lag time to individual players because object motion for nearby objects, which those players will first attempt to simulate, is simulated locally, rather than on a server or by another client. Thus there is a very small, if any, perceivable time delay between when an object is simulated and when a player sees the results of that simulation (typically motion). This is especially convenient for the player's avatar, which may also be physically simulated.

A server simulation region (SSR) is a volume of virtual space left over from all CSRs in the virtual space. Hence the server region is not defined as a sphere or cylinder or other geometry, rather the cumulative space left over from all of the CSR region space. It is possible that the server may have no SSR available to process physics of objects if all of the virtual space is handled by clients. It is dually noted herein that physics simulation of an object may conceivably be shared by two or more clients as long as those clients get realtime feedback about which properties of the object may be simulated by which client. Such granularity is possible without departing from the spirit and scope of the present invention.

Figure 4:
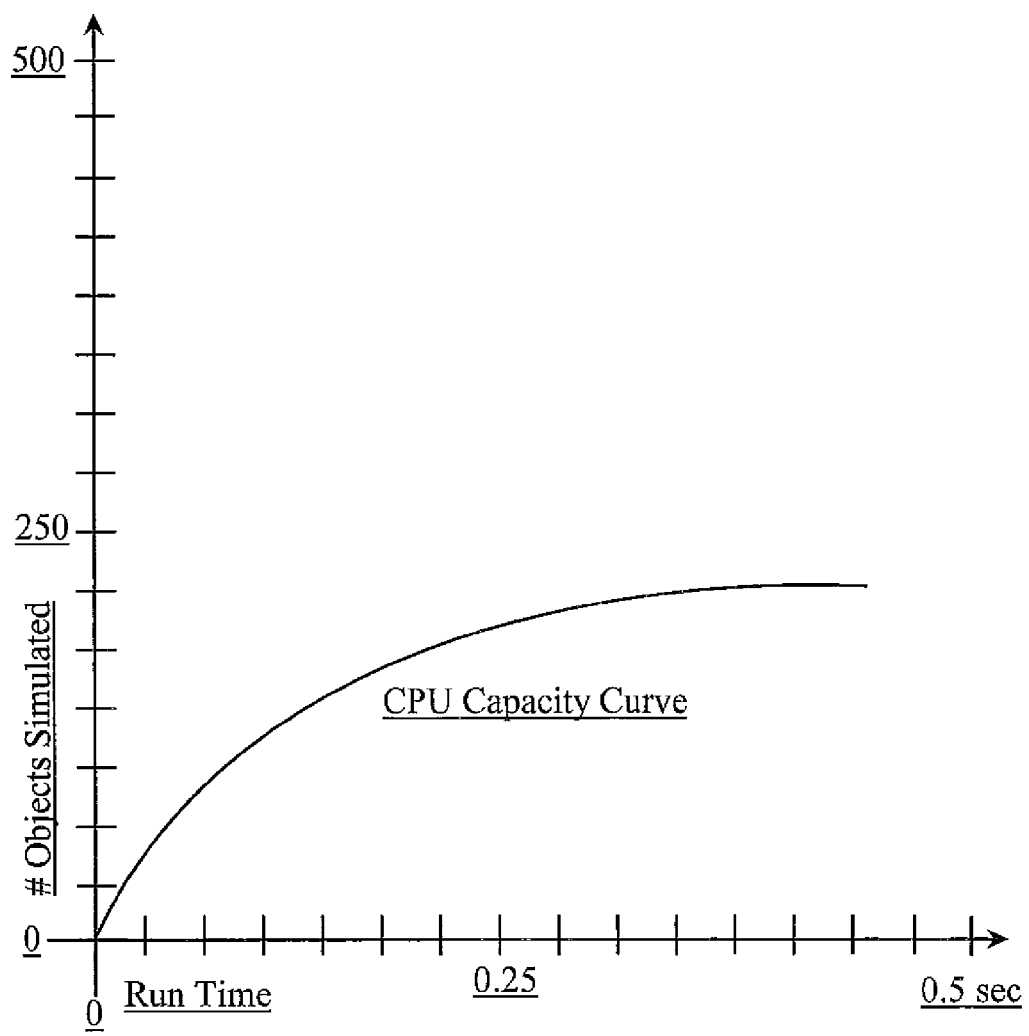
FIG. 4 is a line graph representing a client CPU capacity curve representing physics simulation of virtual objects over time.

FIG. 4 is a line graph representing a client CPU capacity curve representing physics simulation of virtual objects over time. Initially all virtual objects of a VE are assigned to be simulated relative to physics by the game server such as GS 105 of FIG. 1. However, when a client enters the VE the client may begin attempting to simulate those objects that are closest to the avatar of the client. In this respect, and in one embodiment, the client tells the server which parts or objects it is attempting to simulate. As long as there is no capacity issue, a CSR is established around those objects and the client is assigned ownership of simulating those objects.

At time 0 of runtime the client is not simulating any objects in the VE. However, as time progresses, the client CSR expands and the local PSE running on the local CPU begins simulating objects assigned to the CSR. As time moves forward the CSR grows in size or volume. At 0.25 seconds for example, the client is simulating the physics of approximately 178 objects. The number of objects is used logically in this example as some objects require more processing power to simulate than others. However, given standalone objects with stated simulation requirements, numbers of objects may be used as some gauge of capacity for simulation.

In this example the curve represents the capacity of the local client for simulating more objects. The curve tops out at about 0.4 seconds, meaning that the CSR has expanded to include approximately 214 objects having been simulated by the client at that point in time. As the curve flattens the CPU processing capacity for that client to simulate physic of VE objects stabilizes and the CSR volume remains relatively stable. If for some reason CPU power at the client is simultaneously used to perform other tasks not related to object simulation, then the curve will begin to dive resulting in a contracting CSR. The CSR will decrease in volume to a point where stabilization again occurs and will expand again if more CPU resources are freed up to simulate more objects.

It is noted herein that not all objects within a CSR are being simulated by that client simultaneously. Objects are simulated relative to physics based on player actions reported during runtime; hence moments of fluctuation in CSR volume may occur to prevent simulation of too many objects within the region at once. A single object may require significantly more CPU resources to simulate than another object or a group of objects. It is also noted herein that objects may be simulated in groups or "superbodies" as long as the objects included in the superbody do not move relative to one another.

It is also apparent to one with skill in the art that physics of a single object may be broken down by type of motion or movement and may be shared in terms of simulation by one or more clients or by the server and a client.

Figure 5:
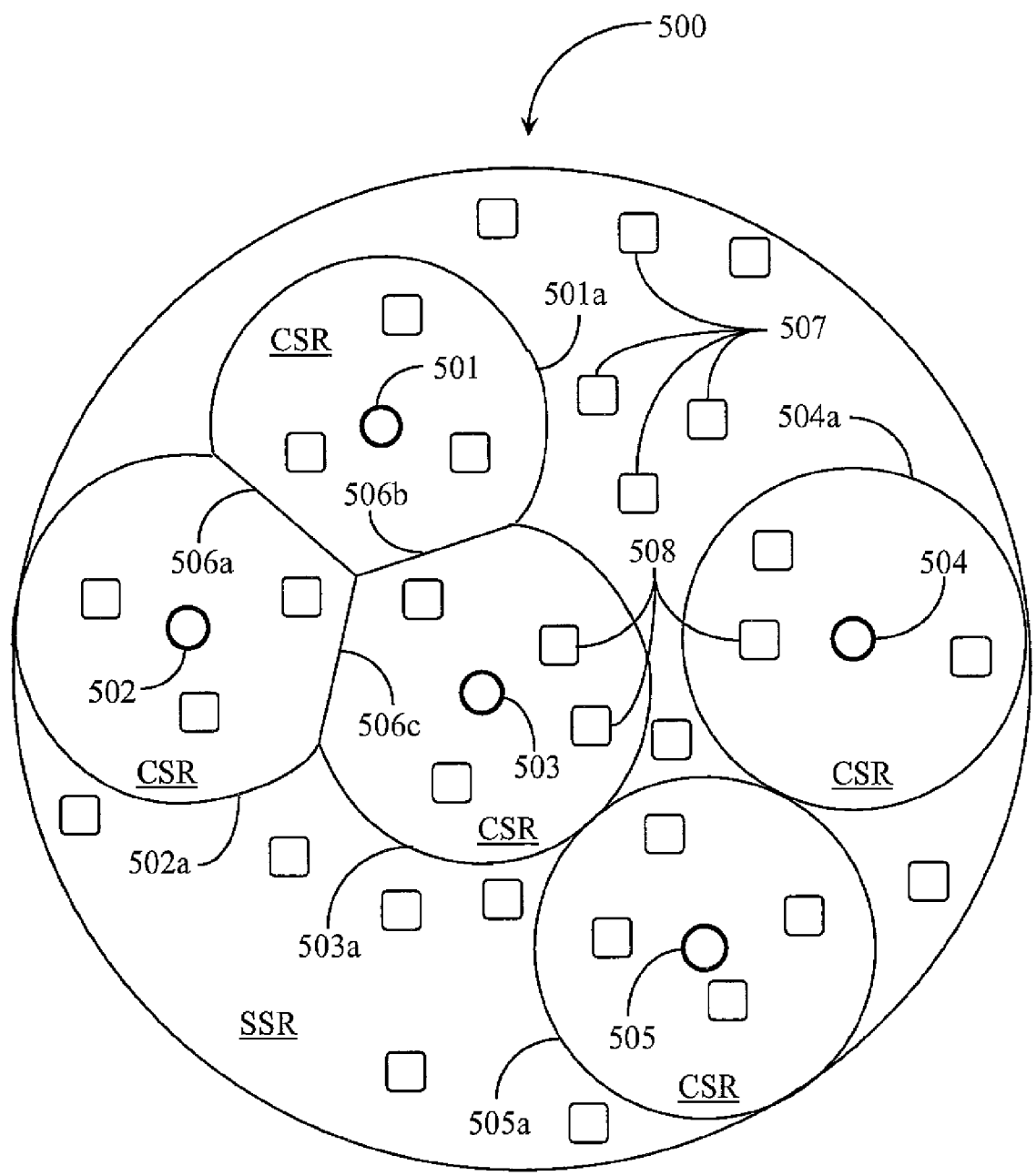
FIG. 5 is a block diagram illustrating a server view of multiple client simulation regions within a virtual environment space according to an embodiment of the present invention.

FIG. 5 is a block diagram illustrating a server view of multiple client simulation regions within a virtual environment space 500 according to an embodiment of the present invention. Virtual space 500 represents all of the virtual space available to a VE such as an online game or a virtual world. It is noted herein that total virtual space of a VE may expand or contract during runtime of the VE without departing from the spirit and scope of the invention. For example, creation of new objects that require more space may result in more virtual space allotted during runtime. The total volume of a VE may be a dynamic or a fixed component.

Virtual space 500 represents all of the space for a specific VE represented. There are 5 clients engaged in play, the clients defined by avatars 501, 502, 503, 504, and 505. Each client has a CSR established. These are CSR 501a for client 501, CSR 502a for client 502, CSR 503a for client 503, CSR 504a for client 504, and CSR 505a for client 505. All of the virtual space that is not included within a CSR is defined as a server simulation region (SSR).

Each CSR is centered about an avatar representing the client or player and each CSR includes a number of objects for physics simulation. The client of a CSR is responsible for simulating all of the objects within the CSR of that client. Objects 508 are illustrated as falling within a CSR. Each object has a unique object ID and each CSR has a unique ID which is that of the client or CL-ID. Objects 507 reside outside of any CSR. Therefore objects 507 are simulated by the server, which has a unique server ID and SSR.

CSR 504a and CSR 505a are standalone CSRs, meaning that they do not overlap any other CSRs. CSR 501a, CSR 502a, and CSR 503a overlap one another, meaning that potentially two or more CSRs might encompass a single object for physics simulation. In this case the server may partition such overlapping regions so that the boundaries between them are clearly defined in space. Typically objects that are simulated by a client are those that reside closest to that client's avatar. By partitioning the overlapping regions, this distinction can be made without ambiguity.

In one embodiment a voronoi region approach might be used to partition overlapping CSRs. In this approach space is divided between the overlapping CSRs based on distance to the character point (avatar). In a variation of this embodiment multiplicatively weighted voronoi regions are used where space is divided based on a weighted distance to the character point or avatar. The weight used may include the size, radius, or volume of the CSR. Any objects such as objects 507, which reside outside the bounds of any CSR fall into the SSR by default and are simulated by the game server with the aid of the game server PSE.

Figure 6:
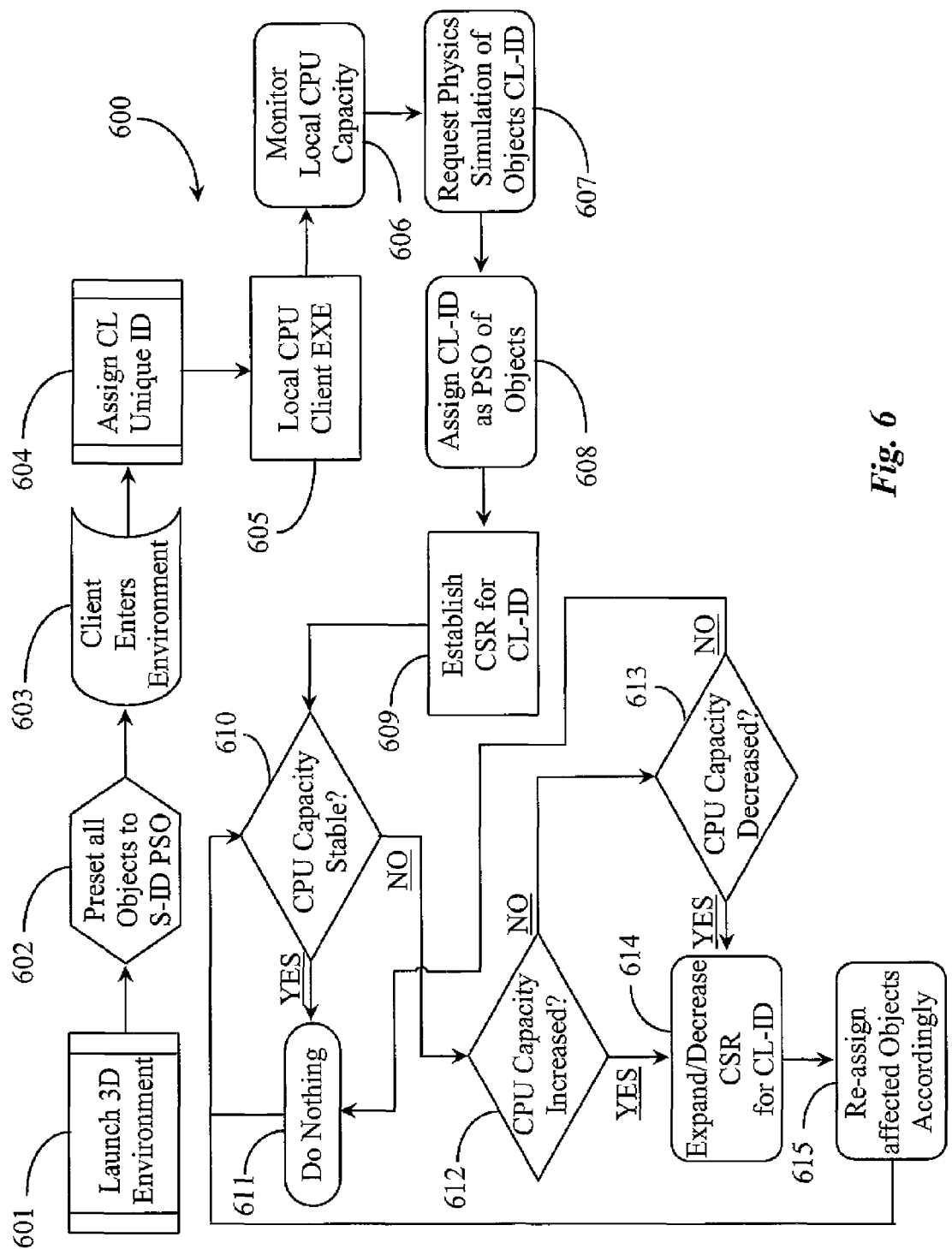
FIG. 6 is a process flow chart illustrating steps for dynamic assignment of client physics simulation properties according to an embodiment of the present invention.

FIG. 6 is a process flow chart 600 illustrating steps for dynamic assignment of client physics simulation ownership according to an embodiment of the present invention. At step 601 a virtual 3-D environment is launched. At step 602, the game server presets all of the objects to the unique server ID as the physics simulation owner (PSO). At this point all objects are simulated by the server. At step 603 a client enters the VE. At step 604 the server assigns the client a unique identifier known as a client ID or CL-ID.

Upon entering the VE, the local client app on the CPU of the client computing device executes at step 605. This application includes a local physics processing engine (PSE), in one embodiment, a rigid body dynamics simulation engine. The application also includes a local CPU monitor, which is responsible for establishing a CSR for the client and for managing the volume of the CSR on an ongoing basis. At step 606 the monitor begins tracking local CPU capacity. The client is assumed to have a unique identifier (CL-ID), and an avatar to anchor the CSR. All of the objects in the VE have unique object IDs. All of the objects are set to be simulated by the server.

At step 607 the client requests physics simulation of one or more objects closest to the client avatar. This information is passed to the server as a unidirectional message from the client computing device over an open connection between the game server and the client. The server assigns the client (CL-ID) as physics simulation owner of the objects of the request received by the server at step 608. The assignment removes the former PSO for each object, in this case, the game server. The game server has a unique identifier, which may be (0) in one embodiment. Step 608 may be a default step for any client initially requesting to simulate locally one or more objects, which are currently being simulated at the server.

At step 609 a CSR is established about the client avatar, which incorporates those objects that have been assigned to the client for physics simulation. The server changes the PSO property of the objects from 0 to the client ID. Now all of those objects will be simulated at the client unless reassigned to another client or back to the server. At step 610, the local CPU monitor determines if the CPU capacity for physics simulation at the local client is stable relative to the number of objects being simulated by the client computing device with the aid of the local PSE over time. If so, the local client does nothing and the CSR remains relatively constant and all of the parts within the CSR that are assigned to the client for physics simulation are simulated by that client whenever necessary. The process loops back to step 610.

If at step 610, it is determined by the CPU monitor that the CPU capacity for physics simulation is not stable or constant, it means that it is increasing due to extra processing capacity, or decreasing due to less CPU capacity available for physics simulation of VE objects. The process moves to determine if the available CPU capacity has increased at step 612. If it is determined at step 612 by the CPU monitor of the client computing device that the available CPU capacity for physics simulation has increased, then the CSR region increases accordingly at step 614 and may then encompass additional objects not currently assigned to the client that may be re-assigned to that local client for physics simulation.

In one embodiment as a CSR increases in volume and one or more unique objects come within its bounds, those objects may be reported to the game server as objects subject to a request for local simulation by that client, at which time the GS may reassign those objects to the local client because they fall within the simulation region of that client. In another embodiment a rule exists whereby any objects residing within any CSR shall be locally simulated relative to physics by the client associated with the CSR. In this case re-assignment is automated at the client and replicated to the server for mapping update and update propagation to other clients. In this case the game server is not responsible for determining assignment of an object for simulation. Rather each client determines what objects it can simulate based solely on current processing resources available at the client.

If the CPU monitor determines at step 612 that the CPU capacity has not increased then at step 613 the monitor determines if it has decreased or there is less capacity for physics simulation of objects. If the CPU monitor determines that the capacity of the CPU/PSE has decreased, at step 614 the CSR may be decreased in volume accordingly possibly freeing up one or more objects for physics simulation by the server or by other clients. If at step 613 the CPU monitor cannot determine if the capacity has decreased after determining that it was not stable and not increasing, then the process moves by default or in error mode back to step 611 and then back to step 610 again. At step 615 all of the objects affected by CSR expansion or contraction are reassigned according to which CSR/SSR they currently reside in.

All physics simulation activity executed on a local client is replicated to the server so the server may update the system including the system PSO map tracking all of the objects in the VE and their PSO properties. Steps 610 through 615 are part of a process loop that continuously loops for each client in the VE as long as that client is detected and is online with the game server. Steps 604 through 608 are repeated for each client playing the game, or more particularly, each client computing device engaged but not yet simulating objects. At step 614 only the objects that fall outside a CSR as a result of CSR contraction are assigned new physics simulation owners (PSO's). It will apparent to one with skill in the art of object management that step 610 is not absolutely required to practice this method of the invention. The local monitor may only determine if the capacity has increased or decreased in no specific order.

In an alternate implementation, steps from 605 onward might be implemented at the server, for example one runtime instance for each client connected to the server. In the case where steps 605 onward are implemented in the server, the client transmits its current CPU load to the server so that the server can implement the CPU capacity algorithm.

Figure 7:
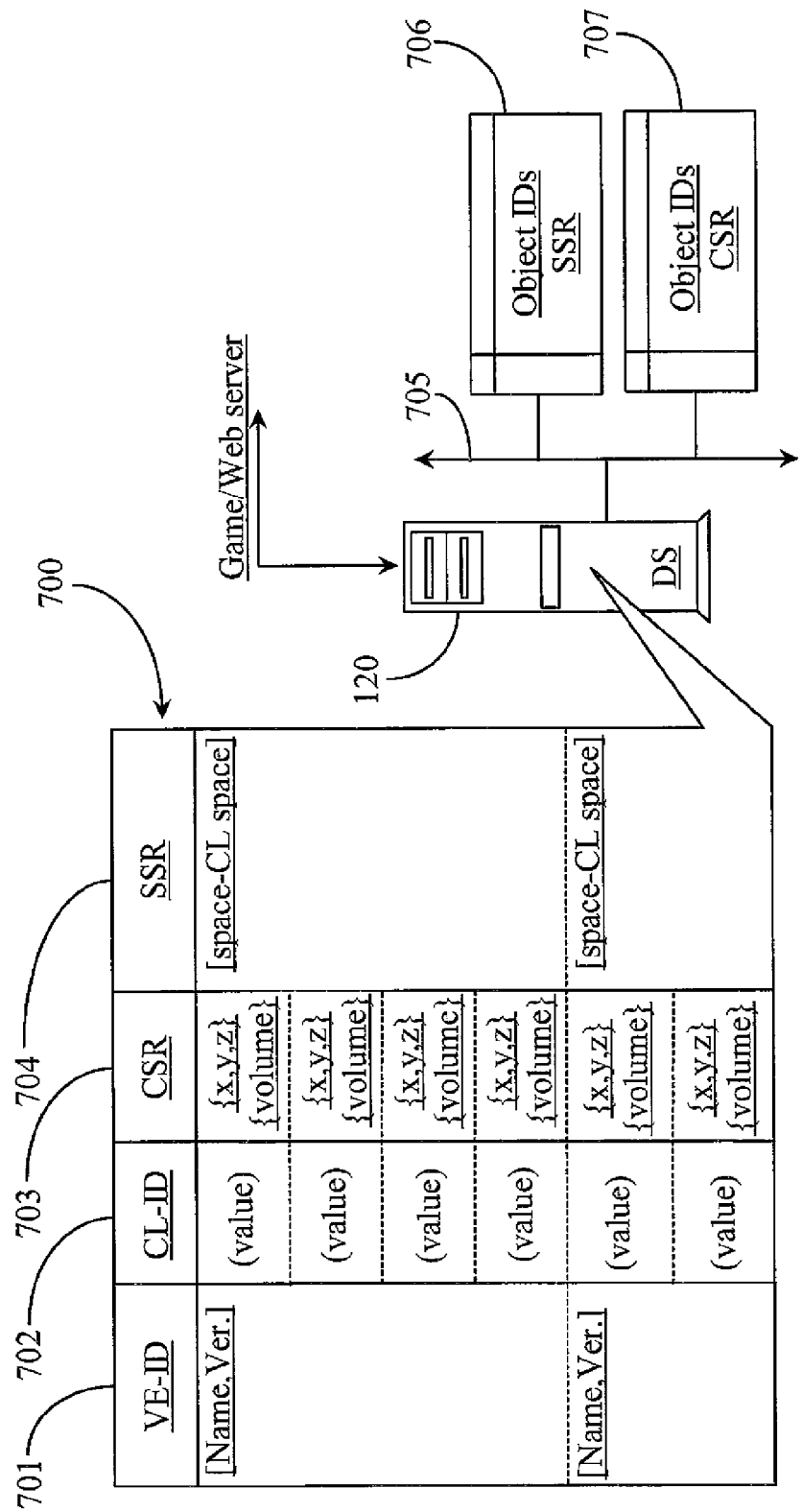
FIG. 7 is a block diagram illustrating a physics simulation ownership map according to an embodiment of the present invention.

FIG. 7 is a block diagram illustrating a physics simulation ownership map 700 according to an embodiment of the present invention. Map 700 is logically illustrated herein as a table of metadata loaded onto data server (DS) 120 connected to the game server of the architecture of FIG. 1. Map 700 as a data table is displayed as a column and row table having a first column 701 labeled VE-ID. This column identifies all of the VEs running on the game server at any time. The tuple may be expressed as a name (name of virtual world or game) and version number of the VE.

Mapping table 700 has a second column 702 labeled CL-ID, which lists all of the current clients that are engaged in game play or otherwise interacting with a virtual environment. Each client ID tuple may be a single value each unique to the client. Random generation and assignment of an identifier may be the default method of identifying clients. Clients may be identified by serial number (machine), IP address, random value, or by other methods. The first VE listed in column 701 has 4 clients engaged. This is subjective only as there may be many more clients engaged in a virtual world for example than can be illustrated in this example.

Mapping table 700 has a third column 703 labeled CSR (client simulation region). Column 703 lists the CSR coordinates and volume or size for every engaged client ID. The CSR may be a sphere or some other volumetric geometry where the coordinates in 3 dimensional space may be quantified such as the volume. In one embodiment the coordinate of a CSR is the center of mass of the client avatar. In a game or virtual environment where an avatar can die, then the CSR and client ID disappear from the table once the information replicates to the game server. All of the objects that were within the CSR of the deceased client now have to be reassigned another PSO (one or more clients, or the server, or a combination thereof).

Mapping table 700 has a fourth column labeled SSR (server simulation region). SSR may be equated to the total virtual space for the VE minus all of the CSR space that exists.

The SSR may not have an anchor point or any coordinates. In the abstract sense any coordinate in the total space that is not included within the bounds of a CSR is in the SSR. If there is more than one server working in concert to support the VE then the SSRs of those servers may be combined into one SSR since from the client perspective it does not matter which server of more than one server simulates an object.

Listing many, possibly thousands of objects in such a two-dimensional table may not be efficient. Therefore, one or more pointers to the object IDs may be associated with each client ID in the table each pointer pointing to all of the objects currently assigned to that client's simulation region. DS 120 may, in one embodiment, maintain a repository 706 containing all of the objects simulated by the server (object IDs SSR), and another repository 707 containing all of the objects simulated by clients (object IDs CSR). Looking up an object ID will tell the system whether the object has a PSO of server or client and if client, which client. There are many different ways a mapping table of simulation ownership might be constructed and different ways it may be operated.

Figure 8:
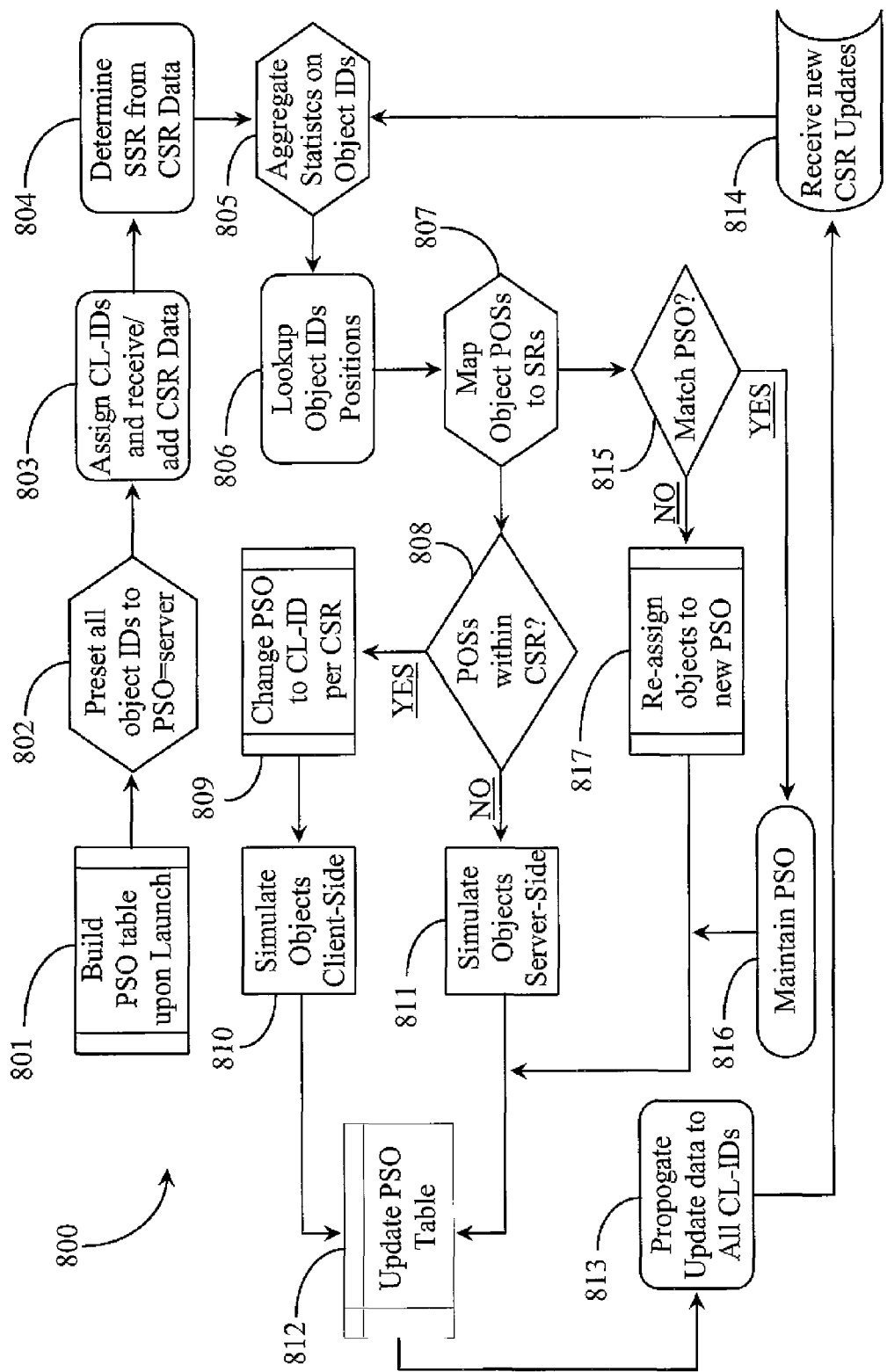
FIG. 8 is a process flow chart illustrating steps for managing distributed physics simulation of multiple virtual objects according to an embodiment of the present invention.

FIG. 8 is a process flow chart illustrating steps 800 for managing distributed physics simulation of multiple virtual objects according to an embodiment of the present invention. At step 801 a physics simulation owner (PSO) table is constructed for a VE launch. In one embodiment a single table is built for any VEs launched by the game server. In another embodiment each VE running has its own mapping table for mapping objects to PSOs.

At step 802, all of the objects of the VE are preset to be simulated by the game server PSE (PSO=server=0) for all object IDs. At step 803, as clients enter the VE, they are assigned client IDSs and the server receives CSR data from those clients indicating the objects that those clients are attempting to simulate. The server may also automatically establish a CSR for any client that indicates a capability to simulate one or more objects. Once a CSR is established, it is monitored locally and may increase or decrease in volume depending on current CPU capacity for simulating physics of the objects resident within each region for each client. At step 804, the server determines the SSR from calculating the total virtual space minus the current and collective CSR space.

In one embodiment the game server aggregates statistics on objects of the VE by ID at step 805 to determine where the objects are (POS) and who should be the PSO of those objects. At step 806 the server performs a lookup of object IDs and their positions (POSs) in virtual space, which may translate to the coordinates of the objects center of mass in the virtual space. At step 807 the server maps the object positions for each object found to a simulation region. That is to say that for any object position, it resides within a CSR (client) or within the SSR (server). At step 808 for each object the server determines if the object resides within a CSR.

If at step 808 the server determines that the object resides within a CSR, then the server (simulation owner assignment engine) changes the PSO property of the object to the CL-ID of the CSR at step 809. At step 810 those objects are simulated client-side by the local PSEs residing at the client computing devices. If at step 808 the server determines that objects reside outside of the boundaries of any CSR, then at step 811 those objects are simulated server-side at the game server. At step 808 objects will be found both residing in a CSR and residing in the server simulation region. These objects are assigned a PSO relative to their positions in 3D space.

At step 812 the SOAE updates the PSO mapping table with the most recent assignment changes. The process then moves to step 813 where all of the updated information including results of simulation are propagated to all of the clients engaged in interaction with the VE. The process then moves to step 814 where the server receives new CSR updates for processing. The process loops back to step 805 where the update statistics are aggregated for processing. Steps 806 through 813 are continuously performed by the server during runtime. All of the physics simulation of objects is distributed according to CSR/SSR regions where those objects are found to reside. All simulation results performed locally by clients are replicated to the server and are propagated from the server to all other clients. Physics simulation update state may, in one embodiment, be propagated among all of the clients through a peer-to-peer network rather than the server propagating all of the updates to all of the other clients.

In one embodiment all objects are simulated by the server and have a PSO=0, which may be the unique identifier of the server, and PSO reassignment to a client ID occurs only after the client has begun simulation of the object and the simulation data is replicated to the server. At this point the server only lookup the object ID of those objects and changes the PSO designation only if the current PSO assignment is not that of the client ID that was the source of the data replication. In this regard step 805 may be replaced by step 814. In another embodiment the server continuously tracks all of the VE objects and reassigns them to new "client" PSOs any time those objects become included in a client CSR. In one embodiment there may be an object that resides in two CSRs such that both clients are attempting to simulate the object. The server may assign a PSO to the object ID whose CSR is currently largest among the contending CSRs. Partitioning overlapping CSRs may be performed by the server to clarify where an object resides and thus which client will be the current PSO of the object.

As described further above, it is possible that more than one client or a client and the server may share simulation of an object if more than one object property is simulated. Such granularity is possible where an object resides in a CSR and has the client ID as a PSO and where that PSO cannot completely simulate the object without becoming unstable. In this case the serve may simulate some motion of the object and the client may simulate the rest of the motion of the object, etc. In this example all of the properties of an object are simulated by a client PSE or by a server PSE and PSO assignment is based on the calculated position of the object relative to one or more defined simulation regions. In all embodiments, the server updates object positional data and property changes replicated thereto by a client to all other clients. All object property changes resulting from server simulation are likewise propagated to all clients so that all of the clients and the server are continually interacting with the latest object versions.

A network replication system is provided that automatically sends the events "Object Create", "Object Delete", and "Property Change" between client and server to maintain an identical list of objects and properties for all parts on both the client and server. Physics simulation applies to at least simulation of motion, and includes full simulation of collision between objects, contact between objects, and mechanical joint properties of each object. Whenever two or more clients attempt to simulate a same object, the server arbitrates to determine which of the clients will be assigned the simulation owner. Objects may differ in properties and attributes during the miniscule amount of time that updates from a change are transmitted, however the fluid dynamics of the environment are not affected by these differences. Events transmitted between server and clients are one-way massages.

One with skill in the art of 3D animation will appreciate that other types of motion simulators and architectures may be used in addition to rigid-body-dynamics simulators without departing from the spirit and scope of the present invention. Objects with rapidly changing centers of mass or "fluid" objects may be simulated by clients or the server using the appropriate simulation components without departing from the spirit and scope of the present invention.

It will be apparent to one with skill in the art that the distributed physics simulation system of the invention may be provided using some or all of the mentioned features and components without departing from the spirit and scope of the present invention. It will also be apparent to the skilled artisan that the embodiments described above are specific examples of a single broader invention which may have greater scope than any of the singular descriptions taught. There may be many alterations made in the descriptions without departing from the spirit and scope of the present invention.

What is claimed is:

1. A system comprising:
    a computerized server having a processor executing software (SW) from a non-transitory machine-readable medium, the SW enabling the server to manage a virtual environment (VE) comprising a plurality of virtually defined objects;
    a network interface at the computerized server communicating with a remote client-side computerized appliance allowing access to and interaction with the VE by a person directly operating the computerized appliance;
    a first physics simulation engine executing as a part of the SW at the computerized server managing the VE;
    a second physics simulation engine executing on the client-side computerized appliance, enabled to calculate object states and properties for objects in the VE; and
    an application executing on the client-side computerized appliance monitoring varying CPU capacity of the client-side computerized appliance and managing a variable volume client-simulation region (CSR) anchored on a specific object having mobility within the VE, the application dynamically expanding or shrinking a boundary defining the volume of the CSR according to a quantity and type of objects to be simulated within the CSR and the varying CPU capacity;
    wherein the second physics simulation engine calculates object states and properties for all the objects of the VE within the volume of the CSR, and the first physics simulation engine calculates states and properties for all the objects of the VE that are not within the boundary of the CSR as objects are assigned and reassigned to the first or second physics simulation engine as a result of said expanding and shrinking the CSR.

2. The system of claim 1 wherein the network is the Internet network.

3. The system of claim 1 wherein the server periodically receives simulation data from the remote client-side computerized appliance, updates the VE accordingly, and transmits updated state of the VE periodically to the remote computerized appliance.

4. The system of claim 1 wherein the specific object of the VE upon which the CSR is anchored is an avatar representing the person directly operating the remote client side computerized appliance.

5. A method comprising the steps:
    (a) managing a virtual environment (VE) comprising a plurality of virtually-defined objects by a network-connected computerized server having a processor executing software (SW) from a non-transitory physical medium;
    (b) connecting the server by a network interface to a remote client-side computerized appliance, allowing access to and interaction with the VE by a person directly operating the client-side computerized appliance;
    (c) executing a first physics simulation engine as a part of the SW at the computerized server managing the VE;
    (d) executing a second physics simulation engine on the client-side computerized appliance, the second physics simulation engine enabled to calculate object states and properties for objects in the VE;
    (e) executing an application on the client-side computerized appliance, monitoring varying CPU capacity of the client-side computerized appliance and managing a variable volume client-simulation region (CSR) anchored on a specific object having mobility within the VE, the application dynamically expanding or shrinking a boundary defining the volume of the CSR according to a quantity and type of objects to be simulated within the CSR and the varying CPU capacity;
    (f) calculating object states and properties for all the objects of the VE within the volume of the CSR by the second physics simulation engine at the client-side computerized appliance, and calculating object states and properties for all objects of the VE that are outside of the boundary of the CSR by the first physics simulation engine executing at the server;
    (g) assigning and reassigning the objects for simulation to the first or second physics simulation engine as a result of said expanding and shrinking the CSR.

6. The method claim 5 wherein the network is the Internet network.

7. The method of claim 5 wherein the server periodically receives simulation data from the remote client-side computerized appliance, updates the VE accordingly, and transmits updated state of the VE periodically to the remote computerized appliance.

8. The method of claim 5 wherein the specific object of the VE upon which the CSR is anchored is an avatar representing the person directly operating the remote client side computerized appliance.

* * * * *